United States Patent
Kim et al.

(10) Patent No.: US 11,066,542 B2
(45) Date of Patent: Jul. 20, 2021

(54) METHOD OF PREPARING THERMOPLASTIC RESIN, THERMOPLASTIC RESIN COMPOSITION INCLUDING THE SAME, AND METHOD OF MANUFACTURING INJECTION-MOLDED ARTICLE USING THERMOPLASTIC RESIN COMPOSITION

(71) Applicant: LG CHEM, LTD., Seoul (KR)

(72) Inventors: Jong Beom Kim, Daejeon (KR); Joo Byung Chai, Daejeon (KR); Yu Sung Jung, Daejeon (KR); Chang Sull Kim, Daejeon (KR); Eun Seon Park, Daejeon (KR); Tae Young Jeon, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 243 days.

(21) Appl. No.: 16/077,426

(22) PCT Filed: Nov. 15, 2017

(86) PCT No.: PCT/KR2017/012940
§ 371 (c)(1),
(2) Date: Aug. 10, 2018

(87) PCT Pub. No.: WO2018/105917
PCT Pub. Date: Jun. 14, 2018

(65) Prior Publication Data
US 2019/0177522 A1    Jun. 13, 2019

(30) Foreign Application Priority Data

Dec. 9, 2016 (KR) .................. 10-2016-0167419
Jul. 17, 2017 (KR) .................. 10-2017-0090297

(51) Int. Cl.
| | |
|---|---|
| B29C 45/00 | (2006.01) |
| C08F 212/10 | (2006.01) |
| C08L 25/12 | (2006.01) |
| C08F 6/22 | (2006.01) |
| C08F 2/24 | (2006.01) |
| B29K 25/00 | (2006.01) |

(52) U.S. Cl.
CPC .......... *C08L 25/12* (2013.01); *B29C 45/0001* (2013.01); *C08F 2/24* (2013.01); *C08F 6/22* (2013.01); *C08F 212/10* (2013.01); *B29K 2025/08* (2013.01)

(58) Field of Classification Search
CPC .... C08F 220/42; C08F 220/44; C08F 212/04; C08F 212/06; C08F 212/08; C08F 212/10; C08F 2/38; C08F 2/32
See application file for complete search history.

(56) References Cited

U.S. PATENT DOCUMENTS

| | | | |
|---|---|---|---|
| 5,556,919 A * | 9/1996 | Oyama | ............... C08L 15/005 525/189 |
| 2006/0106163 A1 | 5/2006 | You et al. | |
| 2010/0261831 A1 | 10/2010 | Luinstra et al. | |
| 2016/0297909 A1 | 10/2016 | Chai et al. | |

FOREIGN PATENT DOCUMENTS

| | | |
|---|---|---|
| CN | 1561353 A | 1/2005 |
| CN | 101006106 A | 7/2007 |
| JP | 3569971 B2 | 9/2004 |
| JP | 4281531 B2 | 6/2009 |
| JP | 5268210 B2 | 8/2013 |
| KR | 10-0455101 B1 | 11/2004 |
| KR | 10-2010-0090705 A | 8/2010 |
| KR | 10-2014-0121841 A | 10/2014 |
| KR | 10-2015-0037460 A | 4/2015 |
| WO | 02090405 A2 | 11/2002 |

OTHER PUBLICATIONS

Office Action dated Mar. 18, 2020 for Chinese Application 201780015702.9.
Eurpean Search Report issued in related EP Application No. 17878656.2 dated Mar. 15, 2019.
International Search Report for PCT/KR2017/012940 filed on Nov. 15, 2017.

* cited by examiner

*Primary Examiner* — Irina S Zemel
*Assistant Examiner* — Jeffrey S Lenihan

(57) ABSTRACT

The present invention relates to a method of preparing a thermoplastic resin, a method of preparing a thermoplastic resin composition including the same, and a method of manufacturing an injection-molded article using the thermoplastic resin composition. By using a mixture of molecular weight modifiers having different reactivities according to the present invention, coagulation may be performed using a small amount of coagulant, productivity may be increased, and a molded article, which is manufactured using a thermoplastic resin, having excellent appearance characteristics along with superior mechanical strength, processability, or the like may be provided.

9 Claims, No Drawings

METHOD OF PREPARING THERMOPLASTIC RESIN, THERMOPLASTIC RESIN COMPOSITION INCLUDING THE SAME, AND METHOD OF MANUFACTURING INJECTION-MOLDED ARTICLE USING THERMOPLASTIC RESIN COMPOSITION

CROSS-REFERENCE TO RELATED APPLICATION

This application is a U.S. National Stage of PCT/KR2017/012940 filed Nov. 15, 2017, which claims priority to Korean Patent Application No. 10-2016-0167419, filed on Dec. 9, 2016, and Korean Patent Application No. 10-2017-0090297, re-filed on Jul. 17, 2017 claiming the benefit of priority based on Korean Patent Application No. 10-2016-0167419, in the Korea Intellectual Property Office, the disclosures of each of which are incorporated herein by reference.

TECHNICAL FIELD

The present invention relates to a method of preparing a thermoplastic resin, a thermoplastic resin composition including the same, and a method of manufacturing an injection-molded article using the thermoplastic resin composition. More particularly, the present invention provides a thermoplastic resin prepared by mixing molecular weight modifiers having different reactivities in a specific ratio. When a latex obtained using the thermoplastic resin is coagulated, a small amount of coagulant is used, thereby providing a thermoplastic resin composition and an injection-molded article exhibiting improved appearance characteristics, such as improved whiteness, and excellent mechanical properties, processability, or the like.

BACKGROUND ART

Since ABS-based resin has excellent impact resistance, stiffness, physical property balance, chemical resistance, gloss, and the like, it is widely used as a resin for extrusion and injection-molding in manufacturing housings of electric/electronic products, automobile parts, toys, and the like. Recently, extruded ABS-based resin has been required to have high tensile strength at high temperatures because it is manufactured to a thin thickness in accordance with the tendency of weight reduction and thinning of electronic products and the like.

ABS-based resin has excellent physical properties such as impact resistance, chemical resistance, and gloss, but is poor in molding processability. Accordingly, ABS-based resin is generally mixed with a styrene-acrylonitrile based resin (SAN-based resin) to prepare a resin composition.

Generally, a SAN-based resin is prepared by bulk polymerization or suspension polymerization. In this case, it is difficult to obtain a high-molecular-weight SAN-based resin. In addition, when the SAN-based resin is mixed with an ABS-based resin, final products exhibit deterioration in mechanical properties such as tensile strength.

To address these problems, attempts have been made to prepare a SAN-based resin by emulsion polymerization. However, this method has limitation in increasing molecular weight. In addition, since non-volatile substances, such as an emulsifier, an electrolyte, an oxidation-reduction catalyst, remain in large amounts, yellowness increases during thermoforming, resulting in decrease in appearance quality or colorability.

Accordingly, a method of adding an additive, such as a white pigment, has been proposed, but, in this case, manufacturing costs are increased and the inherent mechanical properties of the ABS-based resin are deteriorated. Therefore, there is a further need for studies on SAN-based resins having a high molecular weight, excellent appearance characteristics, such as whiteness, and excellent high-temperature tensile strength, processability, and moldability without significantly deteriorating the inherent properties of the ABS-based resin.

RELATED ART DOCUMENT

[Patent Document] (Patent Document 1) KR 10-0455101 B1

DISCLOSURE

Technical Problem

Therefore, the present invention has been made in view of the above problems, and it is one object of the present invention to provide a method of preparing a thermoplastic resin that allows production of a high-molecular weight SAN-based resin capable of producing a final product having excellent mechanical properties, such as tensile strength, processability, and the like and improved appearance characteristics, such as whiteness, of the final product.

It is another object of the present invention to provide a thermoplastic resin composition including the thermoplastic resin and a method of manufacturing an injection-molded article using the thermoplastic resin composition.

The above and other objects can be accomplished by the present disclosure described below.

Technical Solution

In accordance with one aspect of the present invention, provided is a method of preparing a thermoplastic resin, the method including emulsion-polymerizing an aromatic vinyl compound and a vinyl cyan compound, wherein a mixture of 20 to 54% by weight of mercaptan and 46 to 80% by weight of an alpha-alkyl styrene multimer is used as a molecular weight modifier.

In accordance with another aspect of the present invention, provided is a method of preparing a thermoplastic resin composition, the method including a step of kneading and extruding 50 to 80% by weight of a thermoplastic resin prepared by the method and 20 to 50% by weight of an aromatic vinyl compound-diene based rubber-vinyl cyan compound copolymer.

In accordance with yet another aspect of the present invention, provided is a method of manufacturing an injection-molded article, the method including a step of injection-molding a thermoplastic resin composition manufactured by the method.

Advantageous Effects

In accordance with the present invention, a high-molecular-weight thermoplastic resin having uniform molecular weight distribution may be prepared by mixing molecular weight modifiers having different reactivities in a specific ratio upon emulsion polymerization of a thermoplastic SAN-based resin. The prepared high-molecular-weight thermoplastic resin exhibits excellent coagulation effect even at low temperature. In addition, since the high-molecular-weight thermoplastic resin requires a small amount of coagulant, it is excellent in mechanical properties, such as tensile strength, processability, and the like while improving appearance characteristics, such as whiteness, of a final product.

In addition, a thermoplastic resin powder obtained by the method of preparing a thermoplastic resin according to the present invention has low water content, and thus, may contribute to productivity improvement.

BEST MODE

Hereinafter, a method of preparing a thermoplastic resin composition is described in detail.

The present inventors confirmed that, when a mixture of mercaptan having high reactivity and an alpha-alkyl styrene multimer having relatively low reactivity mixed in a specific ratio is used as a molecular weight modifier upon copolymerization of an aromatic vinyl compound and a vinyl cyan compound by emulsion polymerization, a high-molecular-weight SAN-based resin having uniform molecular weight distribution may be prepared and thus coagulation may be performed even at low temperature due to use of a small amount of coagulant, whereby appearance characteristics, such as whiteness, of a final molded article may be improved. Based on these findings, the present invention has been completed.

A method of preparing a thermoplastic resin according to the present invention includes emulsion-polymerizing an aromatic vinyl compound and a vinyl cyan compound, wherein a mixture of 20 to 54% by weight of mercaptan and 46 to 80% by weight of an alpha-alkyl styrene multimer is used as a molecular weight modifier. When a molecular weight modifier mixed in the specific content range as described above is used, a high-molecular-weight thermoplastic resin is prepared. Accordingly, a use amount of coagulant may be reduced upon coagulation of a latex, whereby a high-quality molded article having superior properties, such as mechanical strength and processability, and improved appearance characteristics, as a final product, may be produced.

In another embodiment, the method of preparing a thermoplastic resin of the present invention may be characterized by using 20 to 50% by weight of mercaptan and 50 to 80% by weight of an alpha-alkyl styrene multimer as a molecular weight modifier upon emulsion polymerization of an aromatic vinyl compound and a vinyl cyan compound. Within this range, appearance characteristics, such as whiteness, of a final molded article are improved.

In still another embodiment, in the method of preparing a thermoplastic resin of the present invention, it may be preferred to use 30 to 40% by weight of mercaptan and 60 to 70% by weight of an alpha-alkyl styrene multimer, as a molecular weight modifier, upon emulsion polymerization of an aromatic vinyl compound and a vinyl cyan compound. Within this range, a high-quality molded article having great improvement in appearance characteristics, such as whiteness, may be provided.

A weight ratio of mercaptan to an alpha-alkyl styrene multimer used as a molecular weight modifier in the present invention is preferably 1:0.85 to 1:4, more preferably 1:1 to 1:3, most preferably 1:1 to 1:2.5 or 1:1.5 to 1:2.5. Within this range, a molecular weight of an obtained thermoplastic resin is high, whereby a use amount of coagulant may be reduced upon coagulation. Finally, appearance characteristics, such as whiteness, of a final molded article are improved.

The mercaptan may be, for example, one or more selected from a C1 to C20 chain alkyl mercaptan and a C1 to C20 branched alkyl mercaptan.

As a particular example, the mercaptan may include one or more selected from chain alkyl mercaptans, such as n-octyl mercaptan, n-nonyl mercaptan, n-decyl mercaptan, n-dodecyl mercaptan, and n-octadecyl mercaptan, and branched alkyl mercaptans, such as sec-octyl mercaptan, t-dodecyl mercaptan, and t-nonyl mercaptan. Preferably, the mercaptan includes t-dodecyl mercaptan.

The mercaptan is preferably included in an amount of 20 to 55% by weight, 20 to 50% by weight or 30 to 40% by weight based on a total amount of the molecular weight modifier. Within this range, a polymerization conversion rate is high and a weight average molecular weight of obtained resin is high.

The alpha-alkyl styrene multimer may include, for example, one or more selected from alpha-methyl styrene and alpha-ethyl styrene. Preferably, the alpha-alkyl styrene multimer is an alpha-methylstyrene multimer.

The multimer may be, for example, one or more selected from a dimer, a trimer, and a tetramer. Preferably, the multimer is a dimer.

As a particular example, the alpha-alkyl styrene multimer may be an alpha-methyl styrene dimer, but the present invention is not limited thereto.

Preferably, the alpha-alkyl styrene multimer may be included in an amount of 45 to 80% by weight, 50 to 80% by weight, or 60 to 70% by weight based on a total amount of the molecular weight modifier. Within this range, a polymerization conversion rate is high and appearance characteristics, such as whiteness, of a final molded article are improved. In addition, when the alpha-alkyl styrene multimer is mixed and used within this range, a water content of an obtained thermoplastic resin powder is reduced, and thus, productivity is improved.

Hereinafter, a method of emulsion-polymerizing a thermoplastic resin using the molecular weight modifier is described in detail.

The method of emulsion-polymerizing may include, for example, i) a polymerization step of polymerizing a monomer mixture including an aromatic vinyl compound and a vinyl cyan compound, the molecular weight modifier, an initiator, and an emulsifier; ii) a termination step of terminating the polymerizing when a conversion rate in the polymerization step is 90% or more; and iii) a coagulation step of adding a coagulant to a latex obtained after the termination step, followed by coagulation.

The aromatic vinyl compound is not specifically limited so long as it is a styrene-based compound generally used in the technical field to which the present invention pertains. Preferably, the aromatic vinyl compound is one or more selected from among styrene, alpha-methyl styrene, alpha-ethyl styrene, ortho-ethyl styrene, para-methyl styrene, vinyl toluene, 2,4-dimethyl styrene, and the like. Most preferably, the aromatic vinyl compound may include styrene.

The vinyl cyan compound may be selected as needed without specific limitation so long as it is generally used in the technical field to which the present invention pertains. Preferably, the vinyl cyan compound may be one or more selected from acrylonitrile, methacrylonitrile, and ethacrylonitrile. Most preferably, the vinyl cyan compound includes acrylonitrile.

In the polymerization step i), the monomer mixture may include, for example, 50 to 80% by weight of an aromatic vinyl compound and 20 to 50% by weight of a vinyl cyan compound. Within this range, a final resin has superior property balance.

In another embodiment, the monomer mixture may include 60 to 80% by weight of an aromatic vinyl compound and 20 to 40% by weight of a vinyl cyan compound. Within this range, properties, such as mechanical strength and processability, are superior.

In still another embodiment, the monomer mixture may include 70 to 80% by weight of an aromatic vinyl compound and 20 to 30% by weight of a vinyl cyan compound. Within this range, mechanical strength is superior, and properties, such as heat resistance and processability, are superior.

The molecular weight modifier may be prepared by mixing mercaptan with an alpha-alkyl styrene multimer. The molecular weight modifier may be used in an amount of 0.05 to 1 part by weight, 0.1 to 0.5 parts by weight, or 0.15 to 0.25 parts by weight based on 100 parts by weight of the monomer mixture. Within this range, a high-molecular-weight thermoplastic resin having uniform molecular weight distribution may be prepared.

In particular, the mercaptan may be used, for example, in an amount of 0.01 to 0.3 parts by weight, 0.04 to 0.2 parts by weight, or 0.04 to 0.1 parts by weight based on 100 parts by weight of the monomer mixture. Within this range, a prepared resin exhibits a high molecular weight and a high conversion rate, and appearance characteristics, such as whiteness, of a final molded article are improved.

In addition, the alpha-alkyl styrene multimer may be used, for example, in an amount of 0.05 to 0.7 parts by weight, 0.1 to 0.5 parts by weight, or 0.05 to 0.2 parts by weight. Within this range, a prepared resin exhibits a high polymerization conversion rate, a high molecular weight, and appearance quality, such as whiteness, of a final product is improved.

The initiator is not specifically limited so long as it is generally used in the technical field to which the present invention pertains. Preferably, the initiator may be one or more selected from the group consisting of water-soluble initiators, such as sodium persulfate, potassium persulfate, and ammonium persulfate, and fat-soluble initiators, such as diisopropylbenzene peroxide, cumene hydroperoxide, and t-butyl hydroperoxide.

The initiator is preferably used in an amount of 0.01 to 1 part by weight, 0.05 to 0.5 parts by weight or 0.05 to 0.2 parts by weight based on 100 parts by weight of the monomer mixture. Within this range, a thermoplastic resin having a desired weight average molecular weight may be easily prepared.

The emulsifier may be selectively used as needed without specific limitation so long as it is generally used in the art. Preferably, the emulsifier may be one or more selected from the group consisting of alkyl aryl sulfonates, alkali metal alkyl sulfates, sulfonated alkyl esters, fatty acid salts, rosinates, and the like.

The emulsifier is preferably used, for example, in an amount of 0.1 to 3 parts by weight, 0.5 to 2 parts by weight or 1 to 2 parts by weight based on 100 parts by weight of the monomer mixture. Within this range, polymerization stability and stability of a latex may be secured, and appearance characteristics, such as whiteness, of a final molded article are superior.

In addition, in the polymerization step i), an electrolyte or an oxidation-reduction catalyst may be selectively included as needed.

The electrolyte may be, for example, one or more selected from the group consisting of KCl, NaCl, KHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$, K$_2$HPO$_4$, Na$_2$HPO$_4$, and the like.

The electrolyte is preferably used in an amount of 0.01 to 2 parts by weight based on 100 parts by weight of the monomer mixture.

The oxidation-reduction catalyst may be, for example, one or more selected from the group consisting of dextrose, sodium pyrophosphate, ferrous sulfate, sodium sulfate, and the like.

The oxidation-reduction catalyst is preferably used in an amount of 0.005 to 0.05 parts by weight based on 100 parts by weight of the monomer mixture.

The polymerization step i) may be carried out, for example, at 30 to 60° C., 30 to 40° C., or 50 to 60° C. for 4 to 5 hours. Within this range, heat generation may be easily controlled, and a resin latex having a high polymerization conversion rate may be prepared.

In addition, in the polymerization step i) of the present invention, reactants, such as a monomer mixture, an emulsifier, and an initiator, may be divisionally added according to a polymerization conversion rate so as to improve a polymerization conversion rate.

In the termination step ii) of the present invention, the polymerization is terminated preferably when a conversion rate of the polymerization is 90% or more or 90 to 99% most preferably when the polymerization conversion rate is 95 to 99%. Within this range, a weight average molecular weight of an obtained resin is large, and the content of unreacted monomers is small, whereby appearance quality of a final molded article is improved.

In the present disclosure, the polymerization conversion rate may be obtained according to Mathematical Equation 1 below, after drying an obtained latex and then measuring the weight of the dried latex:

Polymerization conversion rate (%)=[Total solids content(TSC)×(Total weight of added monomers, water and supplementary materials)]/100− (Weight of added supplementary materials except for monomers and water)　　[Mathematical Equation 1]

A thermoplastic resin prepared according to the method of the present invention may be, for example, a high-molecular-weight thermoplastic resin having a weight average molecular weight of 200,000 to 800,000 g/mol, 200,000 to 500,000 g/mol, 200,000 to 300,000 g/mol, 300,000 to 500,000 g/mol, or 400,000 to 500,000 g/mol.

In addition, a thermoplastic resin prepared according to the method of the present invention may have, for example, a molecular weight distribution of 4.4 or less, 4.3 or less, 4.0 or less, or 3.7 or less.

In the present disclosure, the weight average molecular weight and the molecular weight distribution may be measured by gel permeation chromatography after dissolving 1 g of a resin powder in tetrahydrofuran.

The coagulation step iii) of the present invention is a step of adding a coagulant to a resin latex obtained after the termination step ii) to form a coagulated slurry.

The coagulant may be, for example, any one selected from a metal salt coagulant and an acid coagulant. In particular, the coagulant may be one or more selected from the group consisting of sulfuric acid, magnesium sulfate, calcium chloride, and aluminum sulfate. Most preferably, the coagulant includes sulfuric acid. When an acid coagulant, such as sulfuric acid, is used in the coagulation step iii), a water content is low, whereby process efficiency and productivity are improved.

The coagulant is included in an amount of preferably 0.1 to 3 parts by weight, more preferably 0.1 to 2 parts by weight, most preferably 0.5 to 1.5 parts by weight, based on 100 parts by weight of an obtained resin latex (based on solid). Within these ranges, latex coagulation effect is superior and a residual amount of impurities is small, whereby appearance quality, such as whiteness, of a final molded article is improved.

In addition, the coagulant may be an aqueous solution at a concentration of 10 to 20% by weight.

The coagulation step iii) may be carried out, for example, at 80 to 110° C. or 85 to 100° C. Within this range, coagulation effect is superior.

In addition, a process of aging a coagulated slurry at 90 to 120° C. or 100 to 120° C. may be carried out, as needed, after the coagulation. In this case, productivity is improved.

The coagulated slurry obtained after the coagulation step iii) may be dehydrated and dried by a general method, thereby obtaining a thermoplastic resin powder. A water content of a wet powder obtained after the dehydration is preferably 45% by weight or less, 35% by weight or less, or 30% by weight or less. As the water content of the wet powder obtained after the dehydration is low, a load in a drying process is reduced and productivity may be improved. In addition, properties, such as mechanical strength, of a final molded article are superior.

Hereinafter, a method of preparing a thermoplastic resin composition of the present invention is described in detail.

The method of preparing a thermoplastic resin composition includes, for example, a step of kneading and extruding 50 to 80% by weight of a thermoplastic resin powder prepared using the molecular weight modifier according to the present invention and 20 to 50% by weight of an aromatic vinyl compound-diene based rubber-vinyl cyan compound copolymer. Within this range, a finally manufactured molded article is superior in property balance such as mechanical strength and processability.

In another embodiment, the method of preparing a thermoplastic resin composition may include a step of kneading and extruding 60 to 80% by weight of the thermoplastic resin powder and 20 to 40% by weight of an aromatic vinyl compound-diene based rubber-vinyl cyan compound copolymer. Within this range, the properties, such as mechanical strength and processability, of a final molded article are superior.

In still another embodiment, the method of preparing a thermoplastic resin composition may include a step of kneading and extruding 65 to 75% by weight of the thermoplastic resin powder and 25 to 35% by weight of an aromatic vinyl compound-diene based rubber-vinyl cyan compound copolymer. In this case, all of mechanical properties, such as tensile strength, processability, and appearance characteristics, such as whiteness, of a final molded article are superior.

During the kneading, one or more additives such as a lubricant, a colorant, a heat stabilizer, a light stabilizer, and an antioxidant may be further, selectively included as needed.

Upon the kneading and the extrusion, for example, apparatuses, such as a Banbury mixer, a single-screw extruder, a twin-screw extruder, and a buss kneader, may be used, but it should be noted that the present invention is not limited thereto.

In addition, the kneading and the extrusion may be carried out, for example, at 220 to 250° C., 220 to 230° C. or 240 to 250° C.; and at 230 to 250 rpm, 230 to 240 rpm, or 240 to 250 rpm, but the present invention is not limited thereto.

The aromatic vinyl compound-diene based rubber-vinyl cyan compound copolymer is not specifically limited so long as it is a general ABS-based resin. Preferably, a copolymer prepared by grafting a diene-based rubber polymer to an aromatic vinyl compound and a vinyl cyan compound by emulsion polymerization may be used.

In particular, the aromatic vinyl compound-diene based rubber-vinyl cyan compound copolymer may be, for example, a copolymer prepared by emulsion-polymerizing 50 to 80% by weight of a diene-based rubber polymer, 15 to 35% by weight of an aromatic vinyl compound, and 5 to 25% by weight of a vinyl cyan compound.

The diene-based rubber polymer may be, for example, one or more selected from the group including a butadiene polymer, a butadiene-styrene copolymer, a butadiene-acrylonitrile copolymer, an ethylene-propylene copolymer, and the like, but the present invention is not limited thereto. Preferably, the diene-based rubber polymer includes a butadiene polymer.

The aromatic vinyl compound may be, for example, one or more selected from styrene, alpha-methyl styrene, para-methyl styrene, and the like, but the present invention is not limited thereto.

The vinyl cyan compound may be, for example, one or more selected from acrylonitrile, methacrylonitrile, ethacrylonitrile, and the like, but the present invention is not limited thereto.

As a particular example, the aromatic vinyl compound-diene based rubber-vinyl cyan compound copolymer may be a styrene-butadiene rubber-acrylonitrile copolymer prepared by emulsion polymerization, but it should be noted that the present invention is not limited thereto.

Further, a thermoplastic resin composition prepared according to the present invention may be manufactured into an injection-molded article using an injection step. The injection step may be carried out, for example, at 220 to 250° C., 220 to 230° C., or 240 to 250° C. under 50 to 100 bar, 50 to 60 bar, or 90 to 100 bar, but the present invention is not limited thereto.

The injection-molded article is characterized, for example, by having whiteness of 47 or more, 50 or more, or 47 to 55 as measured according to ASTM D1003, i.e., superior appearance characteristics.

The injection-molded article is characterized, for example, by having a melt index of 2 to 10 g/10 min, 2 to 4 g/10 min or 4 to 10 g/10 min (220° C., under a load of 10 kg) as measured according to ASTM D1238, i.e., superior processability and moldability.

In addition, the injection-molded article is characterized, for example, by having a tensile strength of 6 $kg/cm^2$ or more, 10 $kg/cm^2$ or more, or 10 to 15 $kg/cm^2$ measured according to ASTM D638, i.e., superior mechanical strength.

With regard to the method of preparing a thermoplastic resin, the method of preparing a thermoplastic resin composition, and the method of manufacturing an injection-molded article of the present disclosure, it should be noted that other conditions, which are not particularly cited, are not specifically limited so long as they are generally carried out in the technical field to which the present invention pertains, and may be appropriately, selectively performed as needed.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

Preparation of Styrene-Acrylonitrile Resin 150 parts by weight of ion-exchanged water; 75 parts by weight of styrene and 25 parts by weight of acrylonitrile as monomers; 1.5 parts by weight of potassium fatty acid as an emulsifier; and 0.07 parts by weight of t-dodecyl mercaptan (TDDM) and 0.13 parts by weight of alpha-methyl styrene dimer (AMSD) as a molecular weight modifier were fed batchwise into a reactor charged with nitrogen, followed by polymerizing at 60° C. for 4 hours. As a result, a SAN resin latex was prepared.

0.5 parts by weight of a 10 wt % aqueous sulfuric acid solution, as a coagulant, was added to the SAN resin latex, followed by coagulating at 90° C. for 0.5 hours. As a result, a coagulated slurry was prepared. The coagulated slurry was aged by being heated to and held at 96° C. for 0.5 hours in an aging tank, and then was centrifuged at 3,000 rpm to separate water and a wet powder. The wet powder was subjected to a drying process. In particular, the wet powder was brought into contact with 95° C. steam to be dried. Finally, a resin powder having a water content of less than 0.5% by weight was obtained.

Example 2

An experiment was carried out in the same manner as in Example 1, except that 0.05 parts by weight of t-dodecyl mercaptan (TDDM) and 0.15 parts by weight of an alpha-methyl styrene dimer (AMSD) were added as a molecular weight modifier.

Example 3

An experiment was carried out in the same manner as in Example 1, except that 0.1 parts by weight of t-dodecyl mercaptan (TDDM) and 0.1 parts by weight of an alpha-methyl styrene dimer (AMSD) were added as a molecular weight modifier.

Example 4

An experiment was carried out in the same manner as in Example 1, except that 1 part by weight of 20 wt % magnesium sulfate, instead of the aqueous sulfuric acid solution, was added as a coagulant.

Example 5

An experiment was carried out in the same manner as in Example 1, except that 0.04 parts by weight of t-dodecyl mercaptan (TDDM) and 0.16 parts by weight of an alpha-methyl styrene dimer (AMSD) were added as a molecular weight modifier.

Comparative Example 1

An experiment was carried out in the same manner as in Example 1, except that 0.2 parts by weight of t-dodecyl mercaptan (TDDM) were added as a molecular weight modifier.

Comparative Example 2

An experiment was carried out in the same manner as in Example 1, except that 0.2 parts by weight of an alpha-methyl styrene dimer (AMSD) were added as a molecular weight modifier.

Comparative Example 3

An experiment was carried out in the same manner as in Example 1, except that 0.11 parts by weight of t-dodecyl mercaptan (TDDM) and 0.09 parts by weight of an alpha-methyl styrene dimer (AMSD) were added as a molecular weight modifier.

Comparative Example 4

An experiment was carried out in the same manner as in Example 1, except that 0.03 parts by weight of t-dodecyl mercaptan (TDDM) and 0.17 parts by weight of an alpha-methyl styrene dimer (AMSD) were added as a molecular weight modifier.

Comparative Example 5

An experiment was carried out in the same manner as in Example 1, except that 0.19 parts by weight of t-dodecyl mercaptan (TDDM) and 0.01 parts by weight of an alpha-methyl styrene dimer (AMSD) were added as a molecular weight modifier.

Test Example

The properties of the SAN resin prepared according to each of the examples, the reference examples, and the comparative examples were measured according to the following methods. Results are summarized in Table 1 below.

1) Polymerization conversion rate (%): 1.5 g of a latex obtained after emulsion polymerization was dried in a 150° C. hot air dryer, and then the weight of the dried latex was measured to find a total solids content (TSC). A polymerization conversion rate (%) was calculated according to Mathematical Equation 1 below:

$$\text{Polymerization conversion rate (\%)} = \frac{[\text{Total solids content(TSC)} \times (\text{Total weight of added monomers, water and supplementary materials})]/100 - (\text{Weight of added supplementary materials except for monomers and water})}{} \quad [\text{Mathematical Equation 1}]$$

2) Weight average molecular weight (g/mol): 1 g of a latex obtained after emulsion polymerization was dissolved in tetrahydrofuran, and then the weight average molecular weight of the resultant mixture was measured using GPC.

3) Water content of resin powder (% by weight): A water content of a wet powder obtained after dehydration was measured, and the wet powder was completely dried at 120° C. using a moisture analyzer (METTLER/TOLEDO HR83-P), followed by calculating a weight change.

4) Molecular weight distribution: 1 g of a resin powder (dry powder) obtained after emulsion polymerization was dissolved in tetrahydrofuran, and then the molecular weight distribution of the resultant mixture was measured using GPC.

TABLE 1

|  | Examples | | | | | Comparative examples | | | | |
| --- | --- | --- | --- | --- | --- | --- | --- | --- | --- | --- |
| Classification | 1 | 2 | 3 | 4 | 5 | 1 | 2 | 3 | 4 | 5 |
| TDDM content | 35 | 25 | 50 | 35 | 20 | 100 | — | 55 | 15 | 95 |
| AMSD content | 65 | 75 | 50 | 65 | 80 | — | 100 | 45 | 85 | 5 |
| Weight ratio of TDDM:AMSD | 1:1.86 | 1:3 | 1:1 | 1:1.86 | 1:4 | — | — | 1:0.8 | 1:5.67 | 1:0.053 |
| Polymerization conversion rate (%) | 97 | 96 | 97.5 | 97 | 93 | 98 | 90 | 97.8 | 95.5 | 97.7 |
| Weight average molecular weight (g/mol) | 350,000 | 700,000 | 200,000 | 350,000 | 750,000 | 150,000 | 1200,000 | 180,000 | 900,000 | 160,000 |
| Molecular weight distribution (PDI) | 3.5 | 3.7 | 3.2 | 3.6 | 3.7 | 2.8 | 4.5 | 3.1 | 3.8 | 2.9 |
| Coagulant addition amount (parts by weight) | 0.5 | 1.0 | 1.0 | 1.0 | 1.0 | 1.0 | 1.0 | 1.0 | 1.0 | 1.0 |
| Coagulant type | Sulfuric acid | Sulfuric acid | Sulfuric acid | Magnesium sulfate | Sulfuric acid | Sulfuric acid | Sulfuric acid | Sulfuric acid | Sulfuric acid | Sulfuric acid |
| Water content (% by weight) | 28 | 43 | 35 | 70 | 40 | 60 | 55 | 60 | 63 | 58 |

(The TDDM content and the AMSD content is given in % by weight based on a total amount of a molecular weight modifier, and the coagulant addition amount is given in parts by weight based on 100 parts by weight of a latex (based on solid)).

As shown in Table 1, it was confirmed that the SAN resins prepared according to the method of the present invention exhibited a high polymerization conversion rate of 93% or more, a uniform molecular weight, and a high weight average molecular weight of 200,000 to 750,000, under the same polymerization conditions.

On the other hand, it was confirmed that the SAN resin prepared using only TDDM, as a molecular weight modifier, exhibited a high polymerization conversion rate, but a lower weight average molecular weight compared to the SAN resins according to the examples. In addition, it was confirmed that the SAN resin prepared using only AMSD, as a molecular weight modifier, exhibited the highest molecular weight, but broad molecular weight distribution and a significantly low polymerization conversion rate.

In addition, it was confirmed that, in the cases of Comparative Examples 3 and Comparative Example 5 in which AMSD was used in a relatively small amount compared to TDDM, the molecular weights of obtained resins were lower than those according to the examples. On the other hand, it was confirmed that, in the case of Comparative Example 4 in which AMSD was used in a relatively large amount compared to TDDM, a water content was higher than those in the examples.

In addition, it was confirmed that water contents in Example 1 to 3 according to the present invention were significantly lower than those in the comparative examples not according to the present invention. In addition, it was confirmed that, in the case of Example 4 in which a metal salt coagulant (magnesium sulfate) was used, a water content of a wet powder was higher than those in Examples 1 to 3 in which an acid coagulant (sulfuric acid) was used.

Use Examples

Use Example 1

70 parts by weight of the SAN resin prepared according to Example 1 and 30 parts by weight of an ABS graft copolymer (DP270 grade, manufactured by LG chemistry) were kneaded and extruded (230° C., 250 rpm), thereby preparing a pellet-type SAN resin composition.

The SAN resin composition was injection-molded (240° C., bar), thereby manufacturing a specimen for property measurement.

Use Example 2 to 10

A specimen for property measurement was manufactured in the same manner as in Use Example 1 except that the SAN resin prepared according to each of Examples 2 to 5 and Comparative Examples 1 to 5 was used.

Test Examples

The properties of the specimen manufactured according to each of the use examples were measured by the following methods. Results are summarized in Table 2 below.
1) Whiteness: Specimen color was compared using the Spectrogard Color System according to ASTM D1003.
2) Melt index (g/10 min): Measured at 220° C. under a load of 10 kg according to ASTM D1238.
3) Tensile strength (kg/cm$^2$): Measured at 150° C. according to ASTM D638.

TABLE 2

| | Use Example 1 | Use Example 2 | Use Example 3 | Use Example 4 | Use Example 5 | Use Example 6 | Use Example 7 | Use Example 8 | Use Example 9 | Use Example 10 |
|---|---|---|---|---|---|---|---|---|---|---|
| SAN resin type | Example 1 | Example 2 | Example 3 | Example 4 | Example 5 | Comparative Example 1 | Comparative Example 2 | Comparative Example 3 | Comparative Example 4 | Comparative Example 5 |
| Weight ratio of ABS to SAN | 30/70 | 30/70 | 30/70 | 30/70 | 30/70 | 30/70 | 30/70 | 30/70 | 30/70 | 30/70 |
| Whiteness | 53 | 48 | 50 | 49 | 47 | 47 | 45 | 50 | 46 | 48 |
| Melt index (g/10 min) | 6.2 | 4.8 | 9.5 | 4.6 | 5.5 | 10.6 | 3.5 | 10.2 | 3.8 | 9.5 |
| Tensile strength (kg/cm$^2$) | 10 | 13 | 7 | 8 | 13 | 5 | 15 | 6 | 12 | 6 |

As shown in Table 2, it was confirmed that Use Examples 1 to 5, in which the SAN resins prepared according to the present invention were used, exhibited superior whiteness and excellent tensile strength, compared to Use Examples 6 to 10 not according to the present invention. In particular, it was confirmed that, in the case of the specimen manufactured using the SAN resin according to Example 1, the highest whiteness was exhibited.

On the other hand, it was confirmed that, in the cases of the specimens of Use Examples 6 and 7, in which the SAN resin prepared using TDDM or AMSD, as a molecular weight modifier, was used, a melt index or tensile strength was significantly low, and thus, property balance was poor.

In addition, it was confirmed that, when a weight ratio of TDDM to AMSD was outside the range of the present invention (Comparative Examples 3 to 5), tensile strength was low or whiteness and melt index were low, whereby poor property balance, compared to the examples, was exhibited.

The invention claimed is:

1. A method of preparing a thermoplastic resin, the method comprising emulsion-polymerizing an aromatic vinyl compound and a vinyl cyan compound, wherein a mixture of 20 to 54% by weight of mercaptan and 46 to 80% by weight of an alpha-alkyl styrene multimer is used as a molecular weight modifier, wherein the emulsion polymerizing comprises:
 i) a polymerization step of polymerizing 100 parts by weight of a monomer mixture comprising 50 to 80% by weight of the aromatic vinyl compound and 20 to 50% by weight of the vinyl cyan compound, 0.05 to 1 part by weight of the molecular weight modifier, 0.01 to 1 part by weight of an initiator, and 0.1 to 3 parts by weight of an emulsifier;
 ii) a termination step of terminating the polymerization step when a conversion rate in the polymerization step is 90% or more; and
 iii) a coagulation step of adding a 0.1 to 3 parts by weight of an acid coagulant to 100 parts by weight of a latex that is obtained after the termination step, followed by coagulation, and
 iv) a dehydration and drying step of the coagulated slurry, wherein the wet powder obtained after the dehydration has a water content of 45% by weight or less,
 wherein the thermoplastic resin has a weight average molecular weight of 350,000 to 750,000 g/mol.

2. The method according to claim 1, wherein the mixture has 20 to 30% by weight of mercaptan 70 to 80% by weight of the alpha-alkyl styrene multimer.

3. The method according to claim 1, wherein the mercaptan is one or more selected from a C1 to C20 chain alkyl mercaptan and a C1 to C20 branched alkyl mercaptan.

4. The method according to claim 1, wherein the alpha-alkyl styrene multimer is one or more selected from an alpha-methyl styrene multimer and an alpha-ethyl styrene multimer.

5. The method according to claim 4, wherein the multimer is one or more selected from a dimer, a trimer, and a tetramer.

6. The method according to claim 1, wherein the polymerization step i) is carried out at 60 to 95° C.

7. The method according to claim 1, wherein the coagulant of the coagulation step iii) is sulfuric acid.

8. The method according to claim 1, wherein the coagulation step iii) is carried out at 80 to 110° C.

9. The method according to claim 1, wherein the wet powder has a water content of 40% or less.

* * * * *